Jan. 13, 1953     L. BODDY     2,625,595
ELECTRICAL SIGNAL CONTROL SYSTEM
Filed Jan. 12, 1950     2 SHEETS—SHEET 1
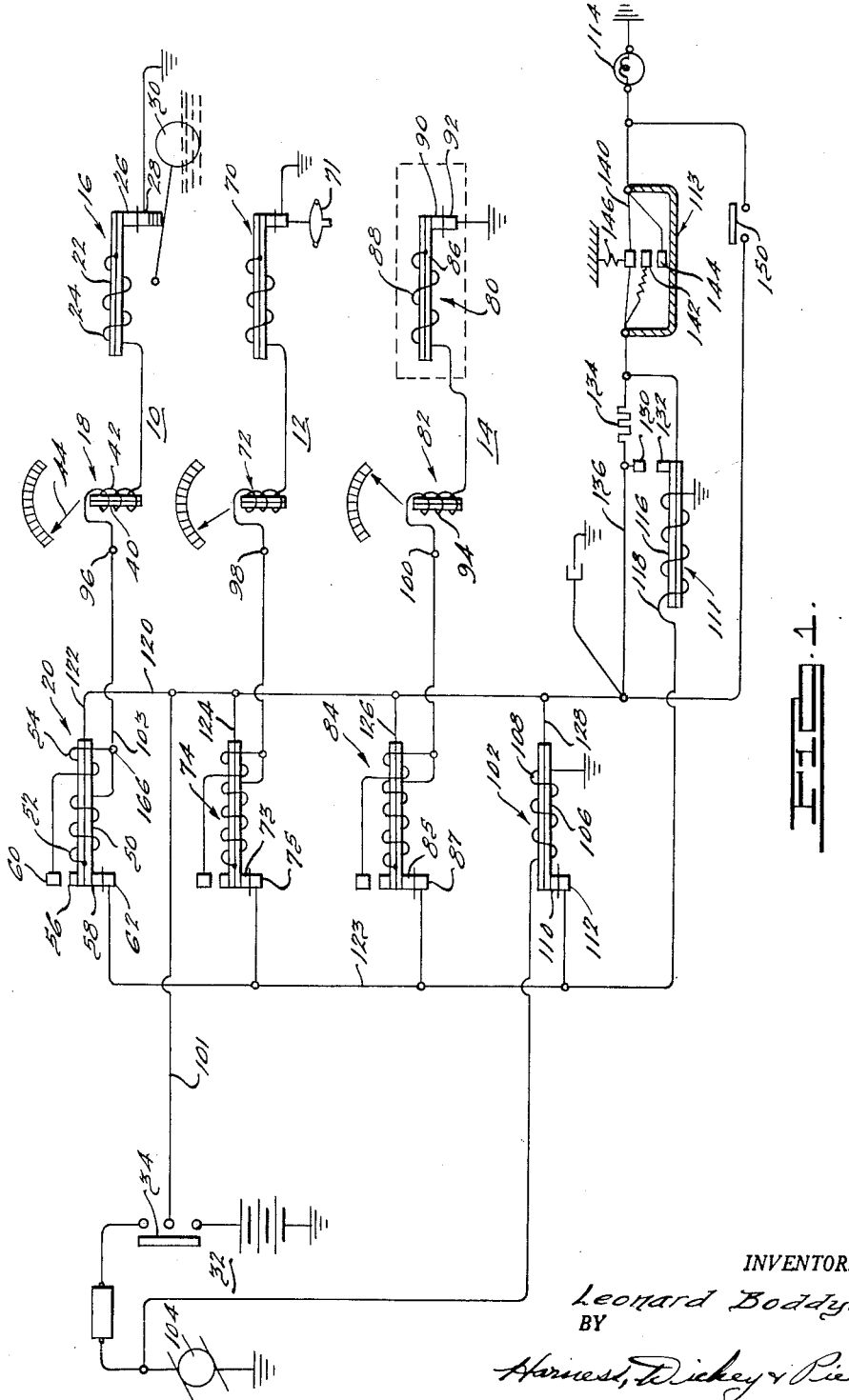
INVENTOR.
Leonard Boddy.
BY
Harness, Dickey & Pierce.
ATTORNEYS.

Jan. 13, 1953      L. BODDY      2,625,595
ELECTRICAL SIGNAL CONTROL SYSTEM
Filed Jan. 12, 1950      2 SHEETS—SHEET 2
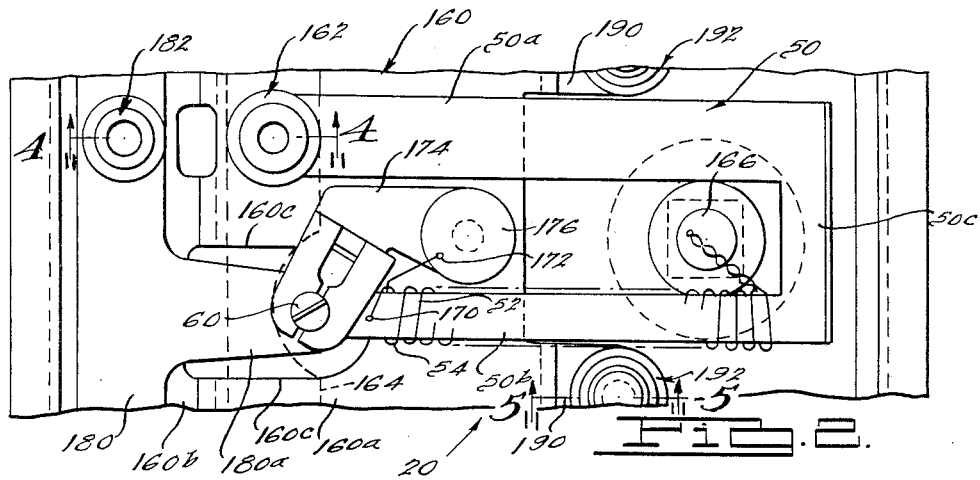
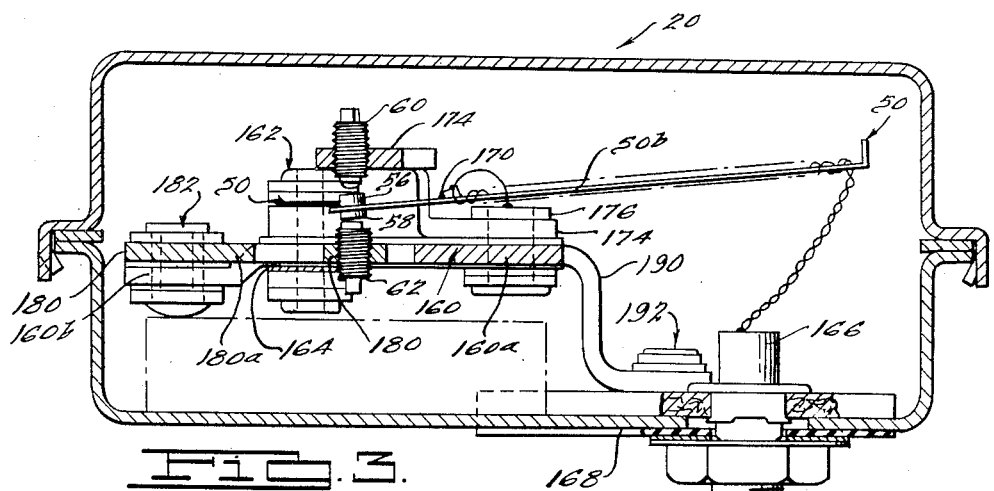
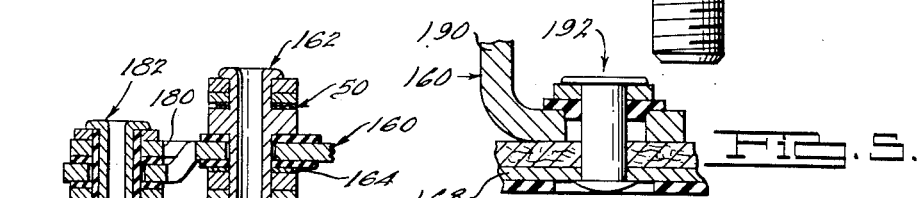
INVENTOR.
Leonard Boddy.
BY
Harness, Dickey & Pierce.
ATTORNEYS.

Patented Jan. 13, 1953

2,625,595

UNITED STATES PATENT OFFICE 2,625,595

ELECTRICAL SIGNAL CONTROL SYSTEM

Leonard Boddy, Ann Arbor, Mich., assignor, by mesne assignments, to The Anderson Company, Gary, Ind., a corporation of Indiana Application January 12, 1950, Serial No. 138,248

12 Claims. (Cl. 177—311)

The present invention relates to electric gauging systems, and in its illustrated embodiment, is directed to automotive gauging systems of the regulated-current type, embodying a plurality of gauges for indicating a plurality of operating conditions of the vehicle, such as fuel level, oil pressure, engine temperature, and the like, and particularly characterized as further embodying improved signal mechanism which becomes operative in the event any one or more or all of the aforesaid operating conditions reaches a critical value.

Electric gauging systems of the regulated-current type, but lacking the hereinafter described signal mechanism, are widely used in the automotive field today, for providing continuous indications of fuel level, oil pressure, and engine temperature. These systems have the basic characteristic that each gauging circuit includes what is known as a sender (which responds to a condition to be measured—fuel level, oil pressure, engine temperature or the like) and which delivers to the corresponding receiver or gauge an average current which is independent of variations in the voltage of the vehicle battery or generator, but which average current is a measure of the operating condition in question.

In accordance with the present invention, a signal relay is interposed in each gauging circuit, in series with the corresponding sender and receiver, and actuates a warning signal, such as a flashing light, when the corresponding operating condition reaches a critical value. For example, in connection with fuel and oil pressure gauges, the signal is actuated in the event these factors fall to a predetermined minimum. In connection with the temperature gauge, the warning signal is actuated in the event the engine temperature reaches a dangerously high value.

Because of the inherent nature of the above sender-receiver systems, a serious power supply problem is presented by the addition to the system of further power consuming elements. This problem is particularly acute in the event it is desired to add the above-mentioned signal system, as an accessory, to a vehicle already equipped with a standard regulated current type of gauging system. The standard receiver and sender units are, of course, designed to give full scale readings at a supply voltage (for example, approximately 5 volts) well below the minimum supply voltage which may be encountered in practice. The fuel and oil pressure signal elements are designed to operate at minimum current values in the associated circuits. At these minimum currents, the signal relays are required to absorb enough power to provide reliable operation.

In the absence of the special features mentioned below, a signal relay which draws an adequate amount of power for reliable operation at minimum currents may draw so much power at the higher currents as to starve the other elements of the corresponding gauge circuit and prevent the corresponding receivers from attaining full scale reading.

This problem is solved, in accordance with the present invention, by so designing the signal relays that the effective impedance (more particularly, the resistance thereof, in the herein illustrated pulsating direct current system) varies as an inverse function of the current drawn by the corresponding gauging circuit. As a result of this action the energy absorbed by the signal relays does not change substantially while the corresponding gauging current is varying between minimum and maximum values.

With the foregoing considerations in view, principal objects of the present invention are to provide electric gauging systems of the regulated-current type, embodying improved signal mechanism which responds in the event a critical condition is reached in any one or more associated gauging circuits; to provide such systems wherein the signal mechanism comprises a signal relay connected in series in each one of a group of related gauging circuits, and further comprises control means responsive to and common to the several signal relays; and to provide such systems wherein the impedances of the signal relays are caused to vary automatically in response to changes in the currents drawn by the associated gauging circuits, whereby to prevent overloading these circuits.

With the above as well as other objects in view, which appear in the following description and in the appended claims, preferred but illustrative embodiments of the invention are shown in the accompanying drawings in which:

Figure 1 is a diagrammatic representation of the gauging system embodying the invention; and, Figs. 2, 3, 4, and 5 are diagrammatic views illustrating details of construction of certain of the components of Fig. 1, Figs. 4 and 5 being vertical sections taken, respectively, along the lines 4—4 and 5—5 of Fig. 2.

It will be appreciated from a complete understanding of the present invention, that the improvements thereof can, in a generic sense, be embodied in regulated-current gauging systems other than the one specifically disclosed herein and that the specific disclosure of this application is to be regarded in an illustrative and not in a limiting sense.

Referring to the drawings, three gauging circuits 10, 12, and 14 are illustrated, and these are conventional, except for the addition of the hereinafter described signal mechanism. Circuit 10 is illustrated as being responsive to fuel level, circuit 12 is illustrated as being responsive to oil pressure, and circuit 14 is illustrated as being responsive to engine temperature.

Circuit 10 comprises the serially connected sender 16, receiver 18 and signal relay 20. Sender 16 may be of any conventional temperature compensated form and is diagrammatically illustrated as comprising a bimetallic body 22 which carries a heater winding 24, one end of which is electrically connected to the body 22. The body 22 also carries a moving contact 26, which normally engages a companion contact 28. The position of contact 28 is governed by the float 30. At low levels of the fuel in the associated tank, float 30 causes contact 28 to rather lightly bear against contact 26. As the fuel level rises, the position of contact 28 is correspondingly elevated which action bends and mechanically loads the bimetallic body 22. It will be noticed that the winding 24 of sender 16 is connected to the usual vehicle carried energy source 32, under control switch 34, in series with signal relay 20 and receiver 18.

Considering first the operation of sender 16, closure of ignition switch 34 enables the source 32 to supply current to winding 24, through normally closed contacts 26 and 28. The consequent flow of current heats body 22, causing the latter to warp and separate contacts 26 and 28, thereby interrupting the current flow. This interruption enables the body 22 to cool, and reclose contacts 26 and 28, thereby re-initiating the heating operation. So long as switch 34 remains closed, accordingly, sender 16 passes pulses of current.

It will be appreciated that these successive pulses of current maintain body 22 at an average temperature just high enough to cause incipient opening and closing of contacts 26 and 28. This average temperature, of course, varies in accordance with the position of contact 28, as determined by float 30. Accordingly, the temperature (above ambient) attained by body 22 is a measure of the position of float 30.

Since sender 16 will absorb just sufficient wattage to maintain the above measuring temperature, it will be appreciated that the action of the device is independent of the voltage of the source 32. If this voltage increases, each current pulse is of greater magnitude but of shorter duration, and vice versa.

Receiver 18 may be of any conventional temperature-compensated form, and is illustrated diagrammatically as comprising a bimetallic body 40, which carries a heater winding 42. Each pulse of current passed by winding 24 is also passed by winding 42. Consequently, bimetallic body 40 acquires a temperature (above ambient) which is a direct function of the temperature (above ambient) of body 22. In any suitable and conventional manner, not shown, the warping of body 40, which accompanies its changes in temperature, is caused to actuate a pointer 44.

Signal relay 20 is shown diagrammatically as comprising a bimetallic body 50, which carries a pair of heater windings 52 and 54. Body 50 carries two contacts 56 and 58, which cooperate, respectively, with fixed contacts 60 and 62. Contacts 58—62 are normally closed. Closure of normally open contacts 56—60 directly connects the normally disconnected winding 54 in parallel with the main winding 52. As is described below, the proportioning of the parts is such that contacts 58—62 remain closed so long as the level of the fuel in the associated tank is very low—5% full or less, for example—but remain open at all higher fuel levels.

Gauging circuit 12 comprises a sender 70, a receiver 72, and a signal relay 74, which may duplicate the above-described elements 16, 18 and 20, except that sender 70 is arranged to respond to oil pressure, which relationship is indicated by the diaphragm unit 71. It will be understood, of course, that relay 74 is adjusted to close its contacts 73 and 75 in the event the oil pressure falls to a sufficiently low value to be indicative of a dangerously low oil pressure. This closing point for contacts 73 and 75 may, as in the case of relay 20, correspond to something of the order of 5% of full scale reading of receiver 72.

The temperature indicating circuit 14 comprises a sender 80, a receiver 82, and a signal relay 84. Sender 80 comprises a bimetallic body 86, which carries a heater winding 88. Body 86 also carries a moving contact 90 which normally engages a companion fixed contact 92. In practice, sender 80 is encased in a body which is introduced into the water jacket of the associated engine. Consequently, independently of the effect of the winding 88, body 86 acquires a temperature corresponding to that of the engine cooling water.

The adjustment of sender 80 is such that at a predetermined high temperature, for example, 212 degrees Fahrenheit, it assumes a position in which contacts 90—92 are continually open, but are just ready to close. Consequently, if the water temperature reaches 212° F., contacts 90—92 remain open, and no current passes through the corresponding gauge circuit. Under these conditions, the associated receiver 82 takes up a position corresponding to full scale reading. On the other hand, if the water temperature falls below 212 degrees, contacts 90—92 close. Such closure enables a pulse of current to be passed through winding 88, enabling it to supply heat to body 86 and bring it up to the critical temperature, reopening contacts 90—92. So long as the water temperature is below the critical value, accordingly, contacts 90—92 periodically open and close, enabling winding 88 to supply to body 86 just enough energy to maintain the latter at the critical temperature. The electrical energy consumed by sender 80 is thus a measure of the difference between the actual water temperature and the aforesaid critical temperature and increases in such energy cause receiver 82 to move in a direction away from the high end of the scale towards the low end of the scale.

Receiver 82 may structurally duplicate the aforesaid receivers 18 and 72, with the exception that mechanical connections are reversed so that increases in temperature of its bimetallic body 94 cause the aforesaid movement towards the low end of the scale instead of towards the high end of the scale.

Signal relay 84 preferably is a duplicate of the aforesaid signal relays 20 and 74. Its adjustment is such that its normally closed contacts 85 and 87 remain closed so long as the engine temperature is within the so-called dangerous range—for example, 190° F. or above. This closing point may, for example, be within about 5% of the full scale reading of receiver 82.

As aforesaid, except for the addition of the signal relays 20, 74 and 84, the aforesaid gauging circuits 10, 12 and 14 are conventional and it will be understood that in the absence of the signal relays, the receiver terminals 96, 98, and 100 may be directly connected to conductor 101 which leads to the source 32. In applying the present signal mechanism, it is possible to make it responsive to operating conditions of the vehicle, other than those to which the normal gauging circuits 10, 12 and 14 are responsive. For example, in the illustrated embodiment, an additional signal relay 102 is provided, which directly responds to the condition of the generator 104. More particularly, relay 102 comprises a bimetallic body 106, which carries a heater winding 108, and is provided with normally closed contacts 110 and 112. Winding 108 is shown as directly connected across generator 104. With this relation, it will be appreciated that so long as the voltage output of the generator is above a critical value, contacts 110—112 remain open. If the generator voltage falls and remains below this critical value for a predetermined interval, determined by the heat loss of the body 106, however, contacts 110 and 112 close, and remain closed so long as the subnormal condition persists. As an example, the critical voltage may be set at approximately 4 volts, which in practice may correspond to a speed of the associated engine at or near the idling speed thereof.

In the illustrated embodiment of the invention, the aforesaid contacts of the signal relays are connected in parallel with each other, and serve to control a time delay relay 111, which in turn, controls a flasher 113, and a signal lamp 114. As shown, relay 111 comprises a bimetallic body 116 which carries a heater winding 118. Winding 118 is connected to the source, through conductors 101 and 120, any of branch conductors 122, 124, 126, and 128, the bodies and the above identified contacts of the signal relays 20, 74, 84, and 102 and through conductor 123. When energized, winding 118 supplies heat to the body 116, and causes closure of the associated relay contacts 130 and 132. This action short-circuits a dimming resistor 134.

Flasher 113 and lamp 114 are normally connected to the source, so long as switch 34 is closed, through conductors 101, 120, 136, and dimming resistor 134. The current in this normal circuit is not sufficiently high to cause operation of flasher 113, but does cause lamp 114 to glow dimly, indicating its operative condition.

Flasher 113 may be variously constructed, but is illustrated as being of the conventional hot wire type. As shown, it comprises a wire 140, the tension in which except when supplied with maximum current, is sufficient to maintain its contacts 142 and 144 in separated condition, in opposition to the continuously acting compression spring 146. This is the normal condition when dimming resistor 134 is included in its circuit. If contacts 130 and 132 close, however, the increased current in wire 140 heats it sufficiently to enable spring 146 to close contacts 142 and 144. Such closure brings lamp 114 to full intensity, and also short-circuits flasher wire 140. The latter action allows the wire to cool, and separate the contacts, thereby re-introducing wire 140 into the circuit of lamp 114 and dimming it to an appreciable extent. So long, accordingly, as contacts 130 and 132 of the time delay relay 111 are closed, flasher 113 acts to cause a flashing action of lamp 114, indicating to the operator of the vehicle that one or more of the signal circuits is indicating a critical condition.

If desired, and as illustrated, one or more operating conditions of the vehicle may be arranged to cause a continuous illumination of lamp 114. As an example, a usual hand brake switch 150 is shown, which is closed so long as the hand brake is set. Under these conditions, closure of switch 34 causes an immediate and continuous lighting of lamp 114.

Considering now the operation of the system as a whole, but with reference only to gauging circuit 10, for example, the various contacts normally occupy the positions relative to each other shown in Figure 1, irrespective of the position of the float 30. Assuming now that ignition switch 34 is closed, circuits are immediately completed for the various components of circuit 10 as well as for the time-delay relay 111. Additionally, the previously traced dimming circuit for lamp 114 is completed, which thereupon glows dimly and indicates its operative condition.

The circuit for the gauging circuit 10 extends from switch 34, through conductors 101, 120, and 122, bimetallic body 50, winding 52, conductor 103, and thence through heater windings 42 and 24, and contacts 26—28, to ground. In response to completion of this circuit, heat is supplied to bimetallic bodies 50, 40, and 22. Due to the thermal capacities of these bodies, a time delay is involved in bringing them to temperatures corresponding to the current flow. The thermal capacities of sender 16 and receiver 18 are preferably so matched that as receiver 18 reaches a position corresponding to the existing position of float 30, contacts 26—28 separate, temporarily interrupting the flow of current. Thereafter, these contacts periodically open and close as aforesaid and permit the passage of a succession of pulses through circuit 10, the average heating value of which is a measure of the position of float 30. Receiver 18 thus assumes a position corresponding to the position of float 30.

The warm-up period of signal relay 20 may be either longer or shorter than that of sender 16. So long as its contacts 58—62 are closed, relay 20 completes a circuit for the winding 118 of the time delay relay 111. This circuit extends from the source through conductors 101 and 122, body 50, contacts 58—62, conductor 123, and winding 118 to ground. While this circuit is completed, winding 118 supplies heat to body 116. If the circuit remains closed long enough, contacts 130—132 of relay 111 close, completing the previously described operating circuit for the flasher and causing lamp 114 to flash.

The timing of relay 111, however, considerably exceeds that of sender 16 and relay 20 so that no flashing action of lamp 114 occurs unless the stable position of relay 20, after completion of the warming-up of sender 16 and relay 20, is still such as to maintain contacts 58—62 in the closed position.

This time delay in relay 111 not only allows for warm-up periods for the several circuit components, following initial closure of switch 34, but also prevents flashing of lamp 114 in response to transient closures of any of the above described signal control contacts of the signal relays 20, 74, 84 and 102. As an example, of such a momentary closure, the generator relay 102 may close its contacts when the engine idles briefly at a traffic intersection.

As shown, winding 118 of relay 111 is supplied directly from the source and is subject to the voltage variations thereof. The actual time delay of this relay may be variously proportioned, but in general, an interval of between 20 and 50 seconds is satisfactory, depending upon the voltage of the source. By proper selection of the design features of relay 111, its drop-out time may be much shorter (of the order, for example, of 5 to 10 seconds) than its aforesaid pull-in time. Thus, a critical operating condition must persist for a substantial interval before flashing of lamp 114 occurs, but correction of the critical condition results in a rather prompt cessation of the flashing.

Neglecting for the time being the effect of winding 54 and contacts 56—60 of relay 20, it will be understood that if in the example given above, the fuel level is below the critical value, contacts 58—62 will remain continuously closed. If, however, the fuel level is above the critical value, relay 20 will, at the end of its warm-up period, open its contacts 58—62 and maintain them open so long as ignition switch 34 is closed and the fuel level is above the critical value.

As aforesaid, an important aspect of the invention resides in solving the power supply problem introduced by the addition to the aforesaid gauging circuits of additional, power consuming, signal relays. The following example will serve to illustrate this problem.

In a typical standard sender-receiver system, the average gauging current corresponding to an empty tank may be of the order of 40 milliamperes and the full scale current, corresponding to a full tank, may be of the order of 200 milliamperes. At full scale reading, the resistance of the receiver may be approximately 13 ohms and that of the sender may be approximately 12 ohms, making an overall circuit resistance of approximately 25 ohms. Five volts from the source is thus sufficient to pass the required 200 milliamperes through this circuit. Under these conditions, it will be appreciated that the sender contacts would remain continuously closed, but would be just ready to open. As a practical matter, the above proportioning allows a substantial factor of safety, because the source voltage does not normally fall below six volts.

The signal relays operate at minimum currents, preferably in the region between the aforesaid minimum of 40 milliamperes and 85 to 90 milliamperes. Manufacturing considerations, of course, make it desirable that these signal relays shall consume a reasonable amount of power. In a typical case, the previously described main windings of the signal relays may contain about 8 ohms of resistance. At minimum current readings, the sender and receiver together may represent approximately 20 ohms which, with an 8 ohm signal relay, brings the overall circuit resistance to 28 ohms. The aforesaid five volt minimum of the source is, of course, able to pass a continuous current of substantially 180 milliamperes through a 28 ohm circuit. Thus at low float positions, sender 16 acts to break the current into pulsations having the desired minimum average value. There is thus ample power even under five volt minimum conditions of the source, to accommodate an 8 ohm signal relay in the gauging circuit at low levels of float 30.

On the other hand, introduction of an 8 ohm signal relay is ruinous under full tank conditions. Such addition would bring the full-tank resistance of the circuit from the previously mentioned 25 ohm value to a 33 ohm value. This amount of resistance would require 6.6 volts to pass 200 milliamperes. This voltage can be expected to be available when the engine is running well above idling speed, but is not normally available from the battery alone, particularly when other loads, such as lights, heaters, radios, etc. are in use.

To take care of this problem, the present invention provides for the aforesaid automatic reduction of the effective resistance of the signal relays as the gauging currents increase, so as to make sure that the signal relays do not overload these circuits.

More particularly, as previously mentioned, relay 20 carries the auxiliary winding 54. Winding 54 is normally disconnected, but in response to closure of contacts 56—60, is connected in parallel with winding 52. In an illustrative case, assuming an 8 ohm resistance for winding 52, winding 54 may have approximately 2.66 ohms of resistance, making the network resistance value of the two equal to 2 ohms.

Assuming that contacts 58—62 open, at a gauging current of, for example, 65 milliamperes, the proportioning of relay 20 may conveniently be such that contacts 56—60 close at an average gauging current of, say, 85 milliamperes. Initial such closure reduces the overall resistance of relay 20 from 8 ohms to 2 ohms. This reduces the overall resistance of circuit 10, but, in view of the inherent current regulating character of sender 16, no increase in average current results. Consequently, the heat supplied to relay 20 following closure of contacts 56—60 is materially reduced and these contacts reopen. Upon reopening of these contacts, the heating effect increases and they reclose. At the 85 milliampere gauging current condition, accordingly, contacts 56—60 remain open most of the time and the effective resistance of the relay under these conditions is substantially equal to the initial 8 ohm value. This value represents only a reasonable load on the circuit.

As the gauging current increases, in response, for example, to a gradual filling of the tank, contacts 56—60 remain closed throughout a progressively increasing percentage of the time and the average or effective resistance of the relay correspondingly decreases.

Assuming that the contacts 56—60 initially close at approximately the 85 milliampere point, it will be appreciated that the wattage input to the relay ($I^2r$) needed to close these contacts or maintain them closed, is slightly under .06 watt. When the gauging current reaches approximately 170 milliamperes, this current over two ohms of resistance, supplies the wattage needed to continuously maintain contacts 56—60 in the closed position under which conditions the relay has the minimum 2 ohm resistance value.

Accordingly, relay 20 maintains its 8 ohm value throughout the range of, for example, 40 to 80 milliamperes of gauging current, progressively reduces its resistance from 8 ohms to 2 ohms as the current rises from 85 milliamperes to 175 milliamperes, and thereafter remains fixed at 2 ohms.

Two ohms of added resistance at the 200 milliampere setting is a safe addition to the circuit. For example, this added 2 ohms brings the total circuit resistance to approximately 27 which requires 5.4 volts to pass the full scale current figure—200 milliamperes.

It will, of course, be appreciated that, broadly speaking, the aforesaid resistance values are illustrative only. Since, within the limits of its power supply, sender 16 acts to maintain an average current which is governed only by float 30, the maximum resistance of relay 20 may be varied rather widely without overloading the power supply. Similarly, in the event the exemplary 2 ohm minimum resistance value should prove to overload the circuit at high float positions, this minimum resistance may be reduced to, if desired, a zero value. Similarly, if desired, by changing the resistance value of winding 54, the pulsating action of relay 20 may be limited to a smaller portion of the range of float 30 or may be extended throughout the entire range thereof. A shortening of the pulsating range reduces the duty to which the contacts are subject, while a lengthening thereof serves to reduce the added load represented by relay 20 at high scale positions of float 30.

It will be appreciated that the foregoing discussion of the operation of circuit 10 applies with equal emphasis to circuit 12 and to circuit 14. In connection with the latter, it will be recalled that because sender 80 is subject to ambient conditions within the engine, it operates on an inverse current principle. Relay 84 of circuit 14, however, acts the same as relays 20 and 74, since high temperature or critical conditions in circuit 14 correspond to minimum current conditions in the circuit.

It will be appreciated that all of the above described bimetallic elements, with the exception of sender 80, which is designed to respond to ambient conditions, may be and preferably are compensated so as to render the action thereof substantially independent of ambient conditions. Such compensation may be introduced in any of a variety of well-known manners. The senders and receivers are commercially available articles and it is believed that no further illustration thereof is needed. As to the self-adjusting signal relays, a presently preferred construction for relays 20, 74 and 84 is shown in Figs. 2, 3 and 4. Relays 102 and 111 may be similarly constructed except for the previously noted differences.

Referring to Figs. 2, 3 and 4 it will be appreciated that as many as may be desired of the above described control elements, with the exception of the senders and receivers, may be combined into a unitary enclosure. In case the signal control mechanism is to be sold as an accessory, it may, of course, be separately enclosed.

The bimetallic element 50 of relay 20 is illustrated as being of U-shaped form, having legs 50a, 50b, and a connecting bridge 50c. The end of leg 50a is supported on a base plate 160, by means of a terminal assembly comprising rivet 162. As best shown in Fig. 4, this terminal assembly includes insulating elements, which insulate the bimetallic element 50 from the base 160, but electrically connect it to a bus bar 164, which may correspond to conductor 120 in Fig. 1.

The other leg 50b of bimetallic element 50, carries the previously described windings 52 and 54, and also carries the previously described electrically interconnected moving contact elements 56 and 58.

It will be appreciated that the above-described U-shaped construction of element 50 renders the relay 20 substantially insensitive to changes in ambient temperature, since such changes affect both legs 50a and 50b in the same sense and cause the bridge portion 50c to move, without, however, causing any substantial movement of the contact carrying end of leg 50b. Currents flowing in the windings 52 and 54, however, serve to elevate the temperature of leg 50b relative to that of leg 50a, and cause the previously described opening and closing movements of the contacts.

The two windings 52 and 54 lead to the common terminal 166, which, as clearly appears in Fig. 3, is insulated from the base plate 160, as well as from the enclosing case 168. Terminal 166 is indicated diagrammatically in Fig. 1, as being located between relay 20 and receiver 18. The other end of winding 52 is, as previously described, welded to the leg 50b, as indicated at 170. The free end of winding 54 is welded at 172, to a terminal bracket 174, which carries the adjustably fixed contact element 60. Bracket 174 is generally Z-shaped, and is riveted at 176, to the base plate 160, but is insulated therefrom.

The other adjustably fixed contact element 62 is adjustably carried by a conducting member 180, which in turn, is secured to, but insulated from, base 160, by the terminal assembly 182. Conducting member 180 may correspond to conductor 123, described in connection with Fig. 1, and, in a unitary signal control mechanism, serves as a bus bar which interconnects the fixed contacts of several of the signal relays.

It is noted that the base plate 160 has a substantially flat body portion 160a, and a depressed shelf portion 160b, which is overlaid by the conducting member 180. The body 160a is cut away as indicated at 160c in Figure 2, to accommodate the laterally projecting portion 180a of conducting member 180. Base 160 is also provided with a plurality of downwardly projecting legs 190 which, as shown, in Fig. 5, are riveted at 192 to the bottom half of the enclosing case 168, but are insulated therefrom.

Although only a single embodiment of the invention has been shown in detail, it will be appreciated that various modifications in the form, number and arrangement of parts may be made without departing from the invention.

What is claimed is:

1. In an electrical gauging system for association with a source having a variable voltage, an electro-responsive sender characterized as being adapted to pass a variable current the average value whereof is independent of variations in said voltage and as embodying means responsive to a variable physical condition to be gauged for adjusting said sender so as to vary said average current value as a function of said physical condition, an electro-responsive receiver connected in series with said sender to receive at least a component of said current, and a signal controlling means connected in series with said sender and receiver to receive at least a component of said current, said signal controlling means embodying means responsive to said last-mentioned component for varying the impedance of said signal controlling means as a function of such component.

2. The system of claim 1 wherein said sender, receiver and responsive means are thermally responsive.

3. The system of claim 1 wherein at least said responsive means is thermally responsive.

4. The system of claim 1 wherein said responsive means comprises a current consuming means, an element arranged in heat exchange relation to said current consuming means and movable in response to heat derived therefrom to vary the impedance.

5. The system of claim 1 wherein said responsive means comprises a current consuming means, an element arranged in heat exchange relation to said current consuming means and movable in response to heat derived therefrom to vary the impedance, and additional means controlled by movement of said element for controlling an associated signal.

6. The system of claim 1 wherein the impedance variation maintains the electrical power absorbed by the signal controlling means substantially constant throughout a predetermined range of action of said sender.

7. In an electrical gauging system for association with a source having a variable voltage, an electro-responsive sender comprising a current conducting element and current modulating means connected in series with said element and controlled thereby in such relation that the average value of the current passed by said sender is independent of variations in said voltage, an electro-responsive receiver connected in series with said element and current modulating means to receive at least a component of said current, a signal controlling means connected in series with said sender and receiver to receive at least a component of said current, said signal controlling means embodying means responsive to said last-mentioned component for varying the impedance of said signal controlling means as a function of such component, and means responsive to a variable physical condition to be gauged for varying the current passed by said receiver and said signal controlling means as a function of said physical condition.

8. The system of claim 7 wherein said sender, receiver and first mentioned responsive means are thermally responsive.

9. The system of claim 7 wherein at least said first mentioned responsive means is thermally responsive.

10. The system of claim 7 wherein said first mentioned responsive means comprises a current consuming means, an element arranged in heat exchange relation to said current consuming means and movable in response to heat derived therefrom to vary the impedance.

11. The system of claim 7 wherein said first mentioned responsive means comprises a current consuming means, an element arranged in heat exchange relation to said current consuming means and movable in response to heat derived therefrom to vary the impedance, and additional means controlled by movement of said element for controlling an associated signal.

12. The system of claim 7 wherein the said impedance variation maintains the electrical power absorbed by the signal controlling means substantially constant throughout a predetermined range of action of said sender.

LEONARD BODDY.

REFERENCES CITED

The following references are of record in the file of this patent:

UNITED STATES PATENTS

| Number | Name | Date |
|---|---|---|
| 880,273 | Bristol | Feb. 25, 1908 |
| 2,226,441 | Paul | Dec. 24, 1940 |
| 2,238,071 | Nazar | Apr. 14, 1941 |
| 2,275,237 | Smulski | Mar. 3, 1942 |
| 2,407,810 | Boddy | Sept. 17, 1946 |
| 2,558,736 | Crews | July 3, 1951 |

FOREIGN PATENTS

| Number | Country | Date |
|---|---|---|
| 507,659 | Great Britain | June 14, 1939 |